(12) United States Patent
Furubayashi et al.

(10) Patent No.: US 12,092,395 B2
(45) Date of Patent: Sep. 17, 2024

(54) OPERATION ANALYSIS METHOD FOR NATURAL GAS PLANT

(71) Applicant: JGC CORPORATION, Kanagawa (JP)

(72) Inventors: Yugo Furubayashi, Kanagawa (JP); Hirokatsu Uchida, Kanagawa (JP); Kenji Mouri, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 324 days.

(21) Appl. No.: 17/625,092

(22) PCT Filed: Jul. 10, 2019

(86) PCT No.: PCT/JP2019/027381
§ 371 (c)(1),
(2) Date: Jan. 6, 2022

(87) PCT Pub. No.: WO2021/005754
PCT Pub. Date: Jan. 14, 2021

(65) Prior Publication Data
US 2022/0276000 A1    Sep. 1, 2022

(51) Int. Cl.
*F25J 3/06*    (2006.01)

(52) U.S. Cl.
CPC ............ *F25J 3/0695* (2013.01); *F25J 3/061* (2013.01)

(58) Field of Classification Search
CPC ..... F25J 3/0695; F25J 1/0252; G05B 13/0255
See application file for complete search history.

(56) References Cited

U.S. PATENT DOCUMENTS

| 4,809,154 A * | 2/1989 | Newton ................. F25J 1/023 700/28 |
| 2018/0356151 A1 | 12/2018 | Suraganda Narayana et al. |

FOREIGN PATENT DOCUMENTS

| JP | S6325481 | 2/1988 |
| JP | 2012185743 | 9/2012 |
| JP | 2018032396 | 3/2018 |
| WO | 2017154181 | 9/2017 |
| WO | 2019097728 | 5/2019 |

OTHER PUBLICATIONS

"International Search Report (Form PCT/ISA/210) of PCT/JP2019/027381", mailed on Oct. 8, 2019, with English translation thereof, pp. 1-4.

* cited by examiner

*Primary Examiner* — Schyler S Sanks
(74) *Attorney, Agent, or Firm* — JCIPRNET (57) ABSTRACT

An operation analysis method for a natural gas plant includes: acquiring production amount data of a product per unit time and operation data of a plurality of controlled devices forming the natural gas plant in association with each other along a time series; determining whether or not a controlled device that violates the operation constraint is present at the time point of acquisition of the production amount data when the production amount data is less than the reference production amount, and performing data processing of associating an item subjected to the operation constraint to the production amount data; and determining, for each of the items subjected to the operation constraints, a length of a period with the production reduction in accordance with a magnitude of the production reduction amount.

6 Claims, 5 Drawing Sheets

OPERATION ANALYSIS METHOD FOR NATURAL GAS PLANT

CROSS-REFERENCE TO RELATED APPLICATION

This application is a 371 application of an international PCT application serial no. PCT/JP2019/027381, filed on Jul. 10, 2019. The entirety of the above-mentioned patent application is hereby incorporated by reference herein and made a part of this specification.

TECHNICAL FIELD

The present invention relates to a technology of analyzing operation condition of a natural gas plant.

BACKGROUND ART

As a kind of a natural gas plant for processing natural gas, there exists a liquefied natural gas plant (hereinafter also referred to as "LNG plant") for liquefying natural gas. In the LNG plant, processing of cooling natural gas (NG) with use of refrigerant to obtain a liquefied natural gas (LNG) is performed. The LNG plant includes a large number of devices including a heat exchanger configured to cool fluid to be cooled (for example, NG or other refrigerant) with use of refrigerant, a refrigerant compressor configured to compress gasified refrigerant, and an air-cooled heat exchanger (ACHE) configured to cool the compressed refrigerant.

During an operation period of the LNG plant, the large number of devices operate at the same time so that various kinds of fluid (NG, refrigerant, and fluid to be used for pre-processing of NG) are processed in parallel in the devices, respectively.

Meanwhile, operation states of the devices, such as a flow rate and a pressure of the fluid to be processed and a drive force of a power device are changed due to disturbances such as an outdoor temperature, a supply pressure of NG, and an NG composition. For example, when there is a fear in that the devices are affected by significant disturbances so that the operation states of the devices fall out of management ranges of operation constraints, it is required to perform operation adjustment to eliminate such operation states.

As an example of the operation adjustment mentioned above, for example, in Patent Literature 1, the following technology is described. Specifically, a temperature of air to be taken into an ACHE or a gas turbine compressor is estimated, and determination is made on whether or not it is required to implement operation adjustment relating to an increase or decrease in LNG production amount (NG processing amount) or an increase or decrease in circulation amount of refrigerant.

Meanwhile, among the devices provided in the LNG plant, operation states of a large number of devices may affect the LNG production amount. Thus, for example, when full production of the LNG plant throughout a year is not achieved, devices that have caused production reduction and a degree of influence of the devices are unclear in some cases.

CITATION LIST

Patent Literature

[PTL 1] WO 2019/097728

SUMMARY OF INVENTION

Technical Problem

The present invention provides a technology for analyzing an item subjected to an operation constraint that affects a production amount of a natural gas plant and a degree of influence of the operation constraint.

Solution to Problem

According to the present invention, there is provided an operation analysis method for a natural gas plant for producing a product from natural gas, the operation analysis method including: acquiring production amount data of the product per unit time and operation data of a plurality of controlled devices, which form the natural gas plant and are subjected to operation control within respective ranges of operation constraints set in advance, for determination of whether or not each of the controlled devices violates the operation constraint, in association with each other along a time series; with use of a computer, comparing a reference production amount per unit time set in advance and the production amount data, determining whether or not a controlled device that violates the operation constraint is present at the time point of acquisition of the production amount data when the production amount data is less than the reference production amount, and performing data processing of associating an item subjected to the operation constraint related to the controlled device with the production amount data when the controlled device that violates the operation constraint is present; and determining a production reduction amount that is a difference between production amount data associated with the items subjected to the operation constraints and the reference production amount, and determining, for each of the items subjected to the operation constraints, a length of a period with the production amount data being less than the reference production amount in accordance with a magnitude of the production reduction amount.

The operation analysis method for a natural gas plant may have the following features.

(a) The operation analysis method for a natural gas plant further includes visualizing a correspondence between the length of the period with the production amount data being less than the reference production amount and a magnitude of the production reduction amount in a graph for each of the items subjected to the operation constraints.

(b) In the determining the length of the period with the production amount data being less than the reference production amount, when a plurality of items subjected to the operation constraints are associated with the production amount data, based on priority set in advance for the items subjected to the operation constraints, the item subjected to the operation constraint that has the highest priority is included in the period in which the production amount data is less than the reference production amount. At this time, with regard to the item subjected to the operation constraint having the highest priority, for the production amount data included in the period with the production amount data being less than the reference production amount, a period with the production amount data for a remainder of the operation constraints being less than the reference production amount is calculated in an overlapping manner.

(c) The natural gas plant is a liquefied natural gas plant for producing liquefied natural gas as a product from natural gas, or a natural gas processing plant for separating and collecting at least one of liquefied petroleum gas (LPG), a heavy component, or a light component as a product from natural gas.
  (e) Combinations of the controlled devices and the respective items subjected to operation constraints include at least one of the combinations selected from a combination group consisting of:
    (i) when the natural gas plant includes a compressor for precooling refrigerant for the natural gas, the precooling compressor and a discharge pressure upper limit value of the precooling compressor;
    (ii) when the natural gas plant includes a compressor for liquefying refrigerant for the natural gas, the liquefying compressor and a drive force upper limit value of the liquefying compressor;
    (iii) when the natural gas plant liquefies the natural gas with use of the liquefying refrigerant, a flow rate adjusting unit for the liquefying refrigerant and a flow rate upper limit of the liquefying refrigerant;
    (iv) when the natural gas plant includes an acid gas removal unit configured to remove acid gas included in the natural gas by bringing the natural gas and an absorption liquid for acid gas into contact with each other, the acid gas removal unit and an upper limit value of a supply flow rate of the absorption liquid to the acid gas removal unit; and
    (v) when the natural gas plant includes an acid gas removal unit configured to remove acid gas included in the natural gas by bringing the natural gas and an absorption liquid for acid gas into contact with each other, the acid gas removal unit and an acid gas content upper limit of the natural gas having been processed by the acid gas removal unit.

Advantageous Effects of Invention

According to this method, the production amount data and the operation data of the natural gas plant are associated with each other along a time series, and with regard to the plurality of the items subjected to the operation constraints, the length of the period with the production amount data being less than the reference production amount is determined in accordance with a magnitude of the production reduction amount, thereby being capable of clarifying the degree of influence of each operation constraint on the production reduction.

DESCRIPTION OF EMBODIMENTS

Now, description is made of an embodiment in which an operation analysis method of this example is applied to a LNG plant being an example of a natural gas plant.

Figure 1:
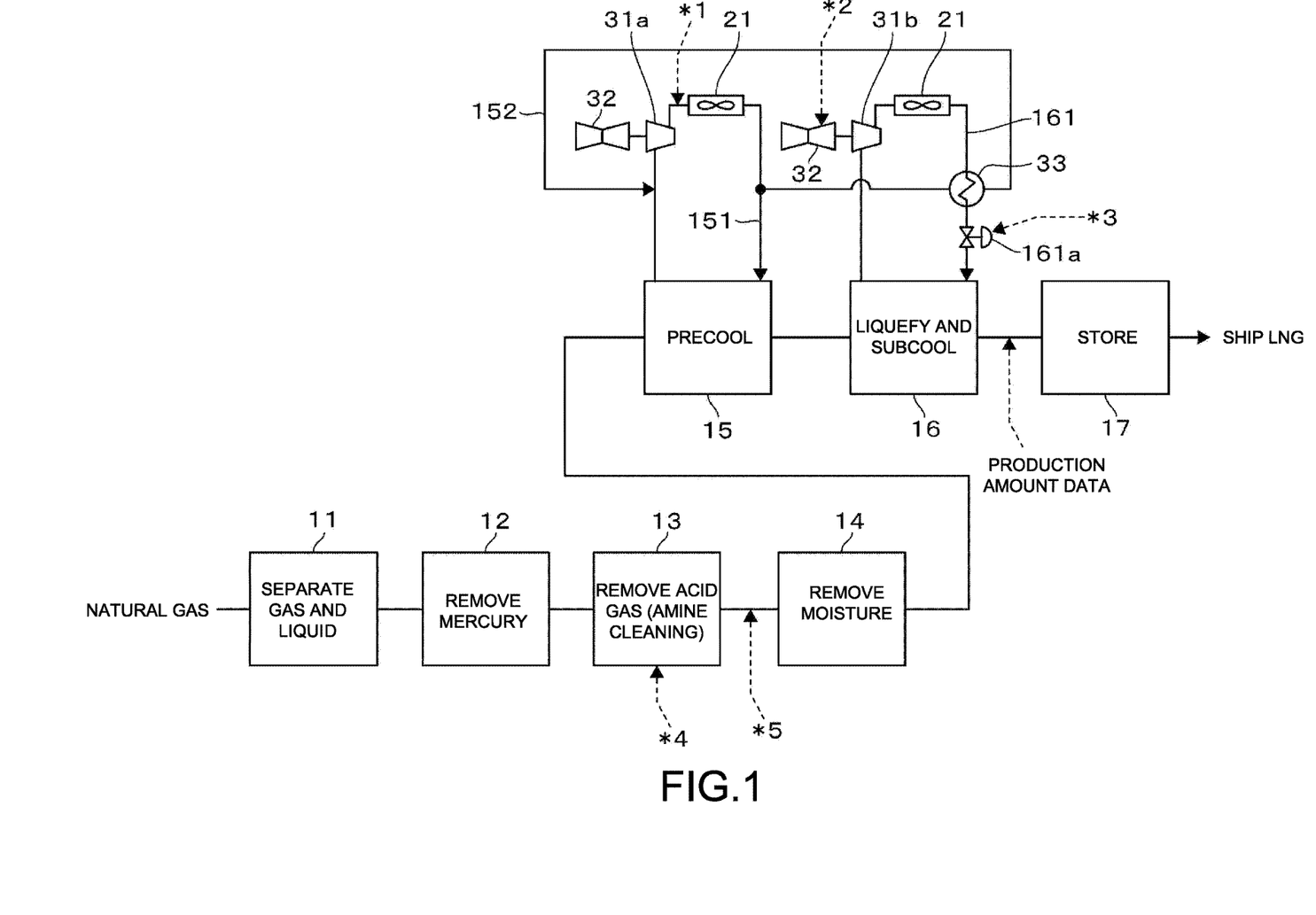
FIG. 1 is a block diagram for schematically illustrating an LNG plant to which an operation analysis method of this example is applied.

FIG. 1 is a block diagram for schematically illustrating a configuration example of the LNG plant. In the LNG plant, a liquid component included in NG produced from a well head is separated in a gas-liquid separation unit 11. After that, mercury is removed in a mercury removal unit 12. Next, in an acid gas removal unit 13, acid gas such as carbon dioxide or hydrogen sulfide is removed. In the acid gas removal unit 13 of this example, the acid gas is removed by bringing an absorption liquid, which includes an amine compound, and the NG into contact with each other. Further, moisture included in the natural gas is removed in a moisture removal unit 14. As a result, removal of impurities from the NG to be liquefied is completed.

The LNG plant illustrated in FIG. 1 includes a precooling unit 15. In the precooling unit 15, the NG to be liquefied is precooled. As precooling refrigerant to be used for precooling of the NG, single refrigerant of propane (C3 refrigerant) is used.

In the precooling unit 15, heat exchange is performed between the NG and the precooling refrigerant through a heat exchanger (not shown). The precooling unit 15 further includes a precooling refrigerant cycle 151. In the precooling refrigerant cycle 151, the refrigerant having been gasified through the heat exchange is compressed by a refrigerant compressor 31a. After that, the compressed refrigerant is cooled and liquefied by a cooler, and then is re-supplied to the precooling unit 15. In this example, an ACHE 21 is used as the cooler.

The LNG plant illustrated in FIG. 1 further includes a refrigerant cooling cycle 152. In the refrigerant cooling cycle 152, part of the precooling refrigerant is drawn out from the precooling refrigerant cycle 151 to cool liquefying refrigerant that is to be supplied to the liquefying and subcooling unit 16 in a latter stage. The precooling refrigerant flowing in the refrigerant cooling cycle 152 cools the liquefying refrigerant on a liquefying refrigerant cycle 161 side in a cooler 33, and then is returned to an inlet of the refrigerant compressor 31a on the precooling refrigerant cycle 151 side. In this example, illustration is also given of an example in which the refrigerant compressor 31a is driven with use of a gas turbine (G/T) 32 as a driver (the same holds true for a refrigerant compressor 31b of the liquefying refrigerant cycle 161 described later).

The liquefying and subcooling unit 16 further cools and liquefies the precooled NG. When the liquefying and subcooling unit 16 employs a mixed-refrigerant system, there is used mixed refrigerant (MR) containing refrigerant component selected from, for example, nitrogen, methane, ethane, ethylene, propane, butane, or isopentane as refrigerant for use in liquefying and subcooling the NG (hereinafter also referred to as "liquefying refrigerant").

In the liquefying and subcooling unit 16, heat exchange is performed between the NG and the above-mentioned refrigerant through a heat exchanger (not shown). The liquefying and subcooling unit 16 further includes the liquefying refrigerant cycle 161. In the liquefying refrigerant cycle 161, the refrigerant having been gasified through the heat exchange is compressed by the refrigerant compressor 31b. After that, the compressed refrigerant is cooled and liquefied by a cooler, and then is re-supplied to the liquefying and subcooling unit 16. In this example, the ACHE 2 is used as the cooler.

The product LNG obtained in the LNG plant is stored in an LNG tank 17 and then is shipped to an outside through, for example, an LNG tanker.

In this example, two systems (A-train and B-train) of the LNG plant illustrated in FIG. 1 are provided.

In the LNG plant having the above-mentioned configuration, a large number of devices are provided. Some of the devices are subjected to operation control so that operation values of, for example, a flow rate and a pressure of the fluid to be processed and a drive force of a power device fall within respective ranges of operation constraints set in advance. In the following, such devices subjected to the operation control are each referred to as "controlled device," and items subjected to the operation constraints are each referred to as "constrained item."

The operation analysis method for an LNG plant of this example gives focus to a relationship between the constrained items of the controlled devices and the LNG production amount.

Figure 2:
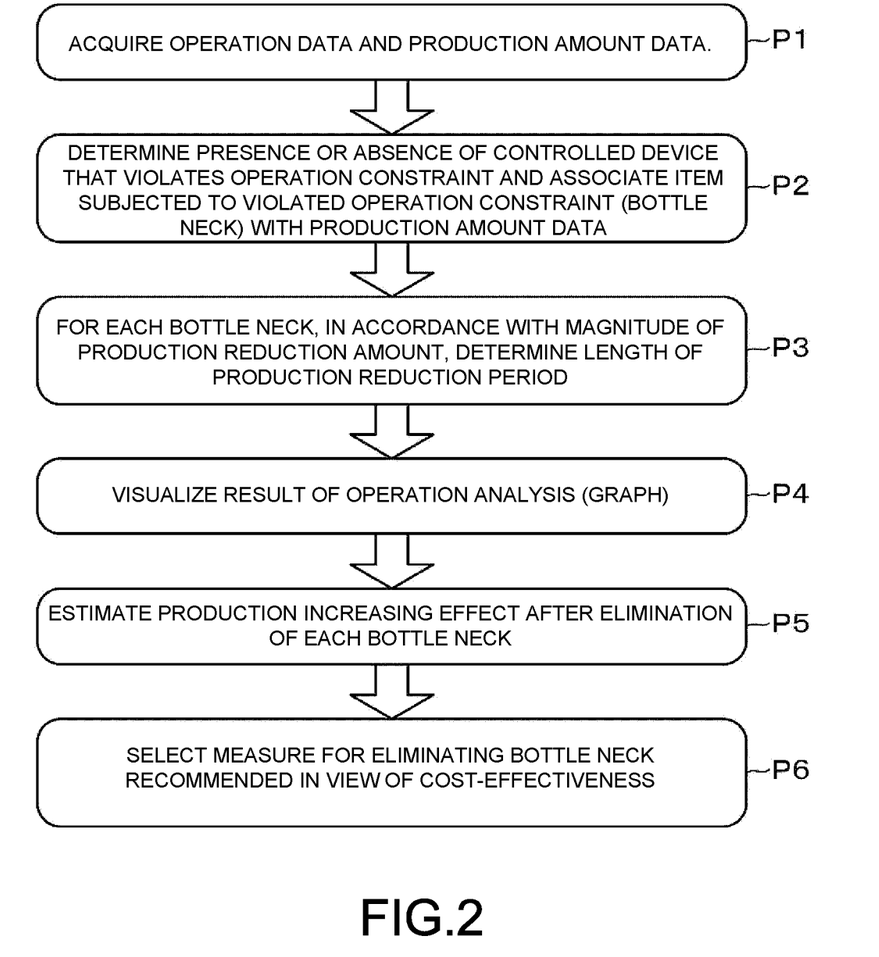
FIG. 2 is an explanatory view for illustrating a procedure of the operation analysis method.

Now, with reference also to FIG. 2, a procedure of the operation analysis method is described.

First, operation data of the controlled devices provided in the LNG plant and production amount data of the LNG are acquired (process P1 of FIG. 2).

The operation values of the controlled devices provided in the LNG plant are acquired along a time series as operation data per unit time (for example, every 1 minute or 5 minutes, or every 15 minutes) via a plant control system such as a distributed control system (DCS). Further, the production amount data per unit time indicating the production amount of the LNG is also acquired along a time series.

Next, determination is made on the presence or absence of a controlled device that violates an operation constraint (process P2 of FIG. 2).

Specifically, focus is given to a correspondence between the operation data of the controlled device and the production data, and when the production amount data is less than a reference production amount (for example, a full production amount) set in advance (when production reduction occurs), determination is made on whether or not a controlled device that violates an operation constraint is present at the time point at which the production amount data is acquired. Through the determination, a constrained device that causes the production reduction of the LNG and a constrained item (bottle neck) corresponding to the operation constraint that is violated at that point of time can be specified.

As the constrained items subjected to the operation constraints to be used for an analysis of a relation to the production amount data, constrained items having hitherto been known as factors that may cause the production reduction may be selected. Further, a hearing with an operator who is involved in the operation of the LNG plant may be conducted to specify the constrained items based on which operation adjustment for the production reduction is inevitable. Besides, all the operation data of the LNG plant may be acquired, and operation constraints corresponding to the operation constraints that are violated during the period of the production reduction may be uniformly extracted as constrained items without determination of the presence or absence of a causal relationship with the production reduction.

Examples of the controlled devices of the LNG plant illustrated in FIG. 1 and respective constrained items are listed below.

(i) The compressor (precooling compressor) 31a for precooling refrigerant and a discharge pressure upper limit value of the refrigerant compressor 31a (*1 of FIG. 1).

(ii) The compressor (liquefying compressor) 31b for liquefying refrigerant and a drive force upper limit value of the refrigerant compressor 31b (*2 of FIG. 1).

(iii) A flow rate adjusting unit 161a for the liquefying refrigerant and a flow rate upper limit value of the liquefying refrigerant (*3 of FIG. 1).

(iv) The acid gas removal unit 13 configured to remove the acid gas by bringing the NG and the absorption liquid into contact with each other and an upper limit value of a supply flow rate of the absorption liquid to the acid gas removal unit 13 (*4 of FIG. 1). Here, when the acid gas removal unit 13 includes a contact column configured to bring the NG and the absorption liquid into contact with each other and a regeneration column configured to regenerate the absorption liquid by releasing the acid gas from the absorption liquid, the "supply flow rate of the absorption liquid" corresponds to an "absorption liquid circulation amount" that is a supply flow rate from the regeneration column to the absorption column.

(v) The acid gas removal unit 13 and an acid gas content upper limit of the NG having being processed in the acid gas removal unit 13 (*5 of FIG. 1). The acid gas content is measured with use of, for example, an analyzer (not shown) that is disposed on an outlet side of the acid gas removal unit 13.

As a method of determining whether or not the controlled devices violate the operation constraints based on the acquired operation data, a method of comparing ranges of the operation constraints set in advance (for example, a set range of an alarm output value) with the operation data can be exemplified. When the operation data falls out of the range of the operation constraint, it is determined that the controlled device violates the operation constraint.

Further, for example, alarm output record data that is set to the operation data is acquired together with the operation data along a time series, and it may be determined that the controlled device violates the operation constraint for the period with the alarm being output.

The range of the operation constraint is not limited to the case in which the set range of the alarm output value is used. For example, in order to avoid a change in operation of the controlled device, an operation value based on which an operator voluntarily starts the production reduction may be grasped through a hearing and set as a threshold value of the range of the operation constraint.

After the constrained item (bottle neck) corresponding to the operation constraint that is violated by the controlled device is specified by the method illustrated above, the constrained item is associated with the production data given at the time point at which the constraint is violated (process P2 of FIG. 2).

At this time, when the production reduction occurs even though no violation occurs in terms of the constrained items (for example, *1 to *5 of FIG. 1) for determination of the presence or absence of violation of the constraint, the production reduction may be associated with "other" constrained item.

After that, for each bottle neck, in accordance with a magnitude of the production reduction amount, a length of the period of production reduction is determined (process P3 of FIG. 2).

The magnitude of the production reduction amount is grasped based on a ratio or a difference value of the production amount data with respect to the reference production amount. The expression of the production reduction amount is not particularly limited as long as a degree of production reduction can be grasped. Further, a range of the production reduction amount may suitably be set so that the degrees of influence of the constrained items can be collectively grasped. For example, the following cases may be exemplified. When the full production is 100%, the range may be expressed in a production amount ratio such as "equal to or higher than 95%, less than 100%" or a production reduction amount in conversion of the amount per day such as "0 tons/day, equal to or less than 10 tons/day."

Further, with regard to the length of the period with the production reduction, when the production data per minute is used, counting is performed such that the production reduction occurred for 1 minute, and a result of counting is multiplied by the period. The length of the production reduction period may be expressed in a period ratio (%) with respect to a whole period during which the operation data or the production data is acquired or with respect to a predetermined period such as 1 year or 1 month, or may be expressed in a total number of hours or a total number of minutes.

After that, as a result of the operation analysis, a correspondence between the length of the period with the production reduction and a magnitude of the production reduction amount is visualized in a graph for each constrained item (process P4 of FIG. 2).

Figure 3:
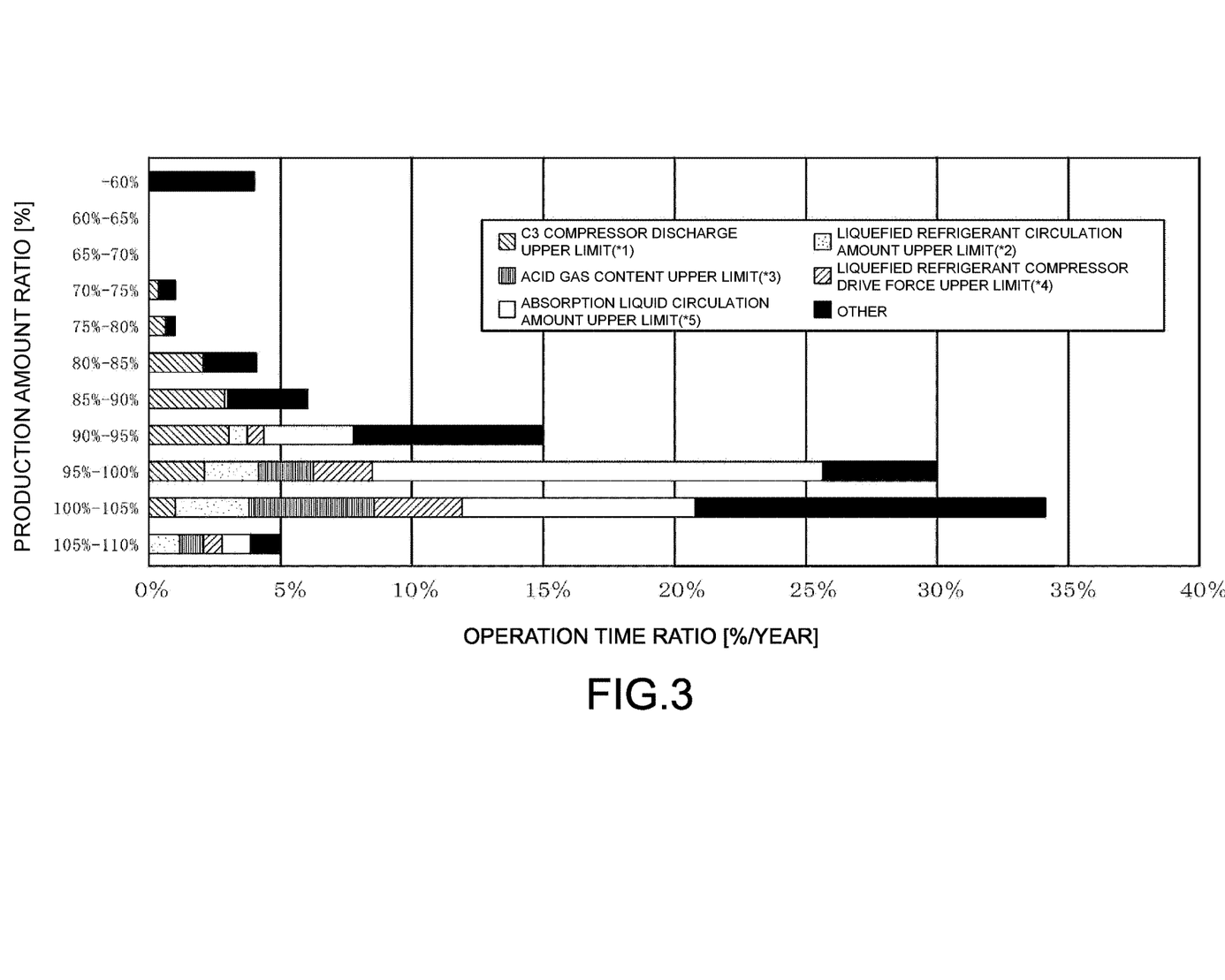
FIG. 3 shows a first example of a result of an operation analysis for the LNG plant.
Figure 4:
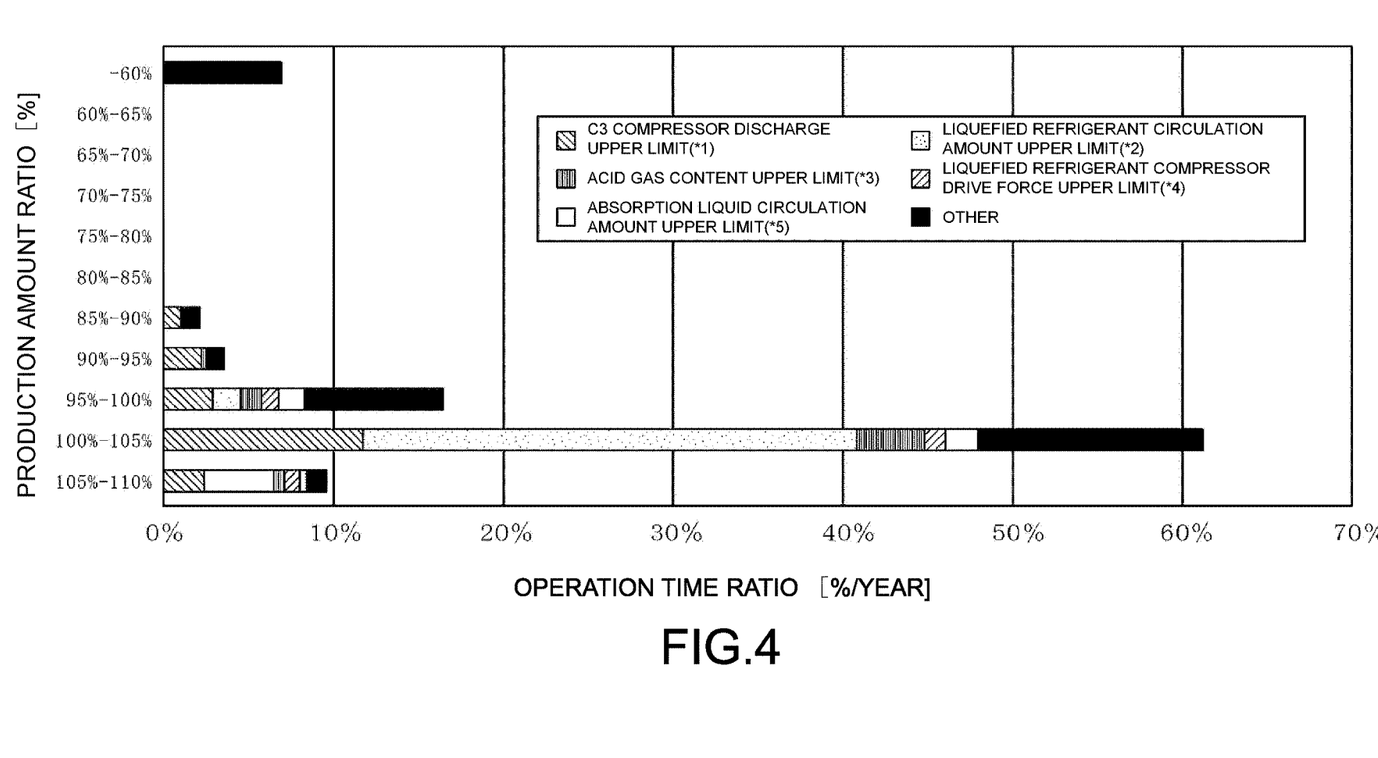
FIG. 4 shows a second example of a result of the operation analysis.

FIG. 3 and FIG. 4 show results expressed in a bar graph in which, for each of the constrained items analyzed through the processes P1 to P3 of FIG. 2, lengths of the period with occurrence of the production reduction (period with the production amount data being less than the reference production amount) are integrated in accordance with a magnitude of the production reduction amount.

FIG. 3 shows a result of the operation analysis for the A-train, and FIG. 4 shows a result of the operation analysis for the B-train. In FIG. 3 and FIG. 4, the horizontal axis represents a period with occurrence of the production reduction, and an occurrence time ratio [%/year] of the production reduction in an operation period of 1 year is described. Further, with regard to the production reduction amount represented by the vertical axis, the production amount ratio with respect to the full production amount is described with ranges divided at 5% intervals.

According to the analysis result shown in FIG. 3, it can be seen that, in the A-train, the production reduction may occur over a wide range of the production amount from equal to or higher than 75% to less than 100% with the discharge pressure upper limit value (described as "C3 compressor discharge pressure upper limit" in FIG. 3) of the refrigerant compressor 31a for the precooling refrigerant being the bottle neck.

Meanwhile, according to the analysis result shown in FIG. 4, it can be seen that, in the B-train, the ratio of the occurrence of the production reduction with the discharge upper limit value of the refrigerant compressor 31a for the precooling refrigerant being the bottle neck is high, but the production reduction amount is limited to the range from equal to or higher than 85% and less than 100%. Further, it can be seen that, as compared with the A-train, in the B-train, a frequency of occurrence of the production reduction with the acid gas content upper limit being the bottle neck is smaller.

Here, with regard to the above-mentioned operation analysis, there may also be a case in which, during a predetermined period with occurrence of the production reduction, operation constraints are violated in terms of a plurality of constrained items.

In this case, the priority can be set to the constrained items (*1 to *5) shown in FIG. 3 and FIG. 4. Then, the production amount data used for calculation of the production reduction period with regard to the constrained items having higher priority may be unused for calculation of production reduction periods of a reminder of the constrained items.

Figure 5:
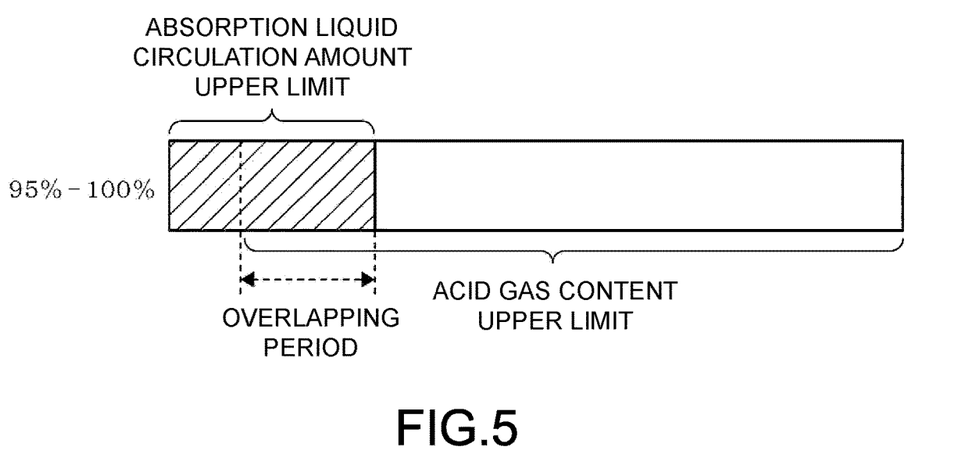
FIG. 5 is an explanatory diagram related to a calculation method for a production reduction period in a case in which a plurality of constrained items are associated.

For example, during the period which is also described as "overlapping period" in FIG. 5, the operation constraints are violated in terms of the two constrained items, that is, the absorption liquid circulation amount (*4) and the acid gas content of the NG (*5). Thus, rather than the acid gas content of the NG, the absorption liquid circulation amount is preferentially associated with the production amount data so that overlapping counting of the production reduction periods can be prevented.

Meanwhile, in order to enable identification of what kind of constrained item is a bottle neck in the overlapping period, with respect to the production amount data having been associated with a certain constrained item ("absorption liquid circulation amount" in the example of FIG. 5), the remaining operation constraints ("acid gas content" in the example of FIG. 5) may also be associated in an overlapping manner, and the overlapping production reduction period may be calculated. As a result, when it does not correspond to a plurality of bottle necks, a constrained item that is difficult to eliminate the production reduction can be grasped.

Further, in this case, with regard to the bar graph of FIG. 5, sections such as a production reduction period resulting from "only the absorption liquid circulation amount," a production reduction period resulting from "both the absorption liquid circulation amount and the acid gas content," and a reduction production period resulting from "only the acid gas content" may be prepared for the operation analysis.

The graphs shown in FIGS. 3 to 5 are examples of the visualization of the operation analysis results, and graphs of other formats may be used. In place of the lengths in the bar graphs shown in FIG. 3 and FIG. 4, for example, the production reduction periods may be expressed by sizes of circles in a pie graph, and ratios of constrained items being the bottle necks may be presented in each pie graph.

Further, the visualization of the result of the operation analysis by a graph is not always required. The process P4 of FIG. 2 may be omitted, and a review in the latter stage may be conducted based only on the data of the operation analysis.

Returning to the description of FIG. 2, in the processes P1 to P4 described above, for example, a computer is used to perform acquisition of data, data processing, and visualization of the analysis result. In particular, in the data processing of the process P2, a computer is used to perform the determination of the presence or absence of the controlled devices that violate the operation constraints and association of the violated constrained items (bottom necks) with the production data.

Then, based on an analysis result obtained through integration of the results of the processes, the production increasing effect given after elimination of each bottle neck is estimated (process P5). For each bottle neck, a range of the production reduction amount and a production reduction period corresponding to the range of the production reduction amount are multiplied, and results of the multiplication are added up to specify the amount of production increase that is to be given when the bottle necks are eliminated. Then, the production increasing effect can be assumed with an increase in profit that can be estimated based on the production increase amount.

Next, based on the cost effectiveness obtained as a result of comparison between the production increasing effect and the cost required for elimination of the bottle necks, a recommended measure for eliminating the bottle neck is selected.

Figure 6:
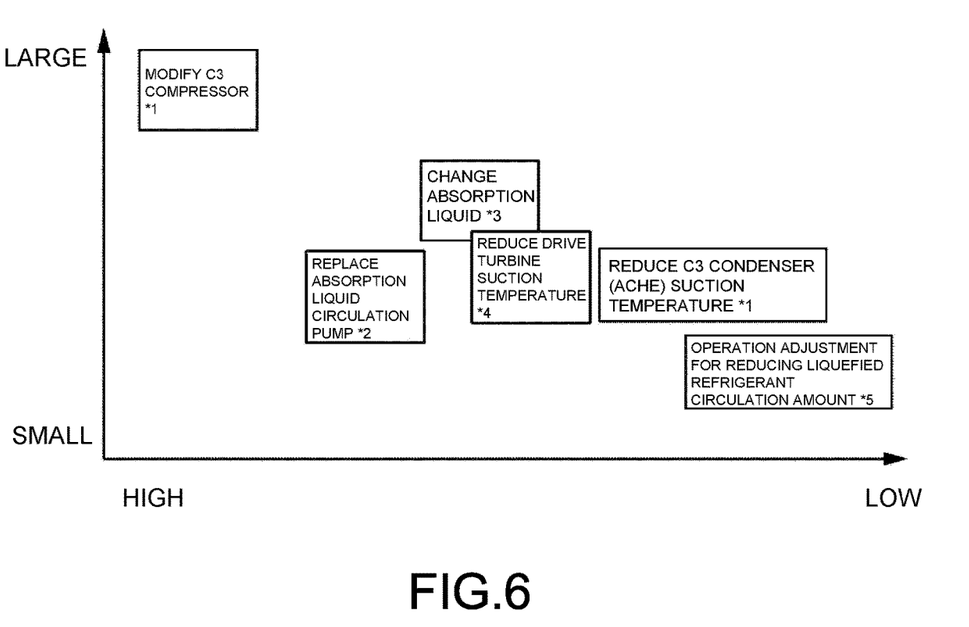
FIG. 6 is an explanatory diagram for showing examples of measures associated with the result of the operation analysis.

FIG. 6 is a graph for showing various measures for eliminating the bottle necks, which are plotted in association with the degree of difficulty in performing the measure and the production increasing effect. The degree of difficulty represented by the horizontal axis is determined based on comprehensive consideration of, for example, cost and construction period required for elimination of the bottle necks and easiness in operation and maintenance. The production increasing effect represented by the vertical axis can be determined based on the result of the operation analysis mentioned above.

Through use of the results of data processing shown in FIG. 3 and FIG. 4, the cost effectiveness of each measure is clarified, thereby being capable of providing the basis for determination regarding selection of a more effective measure.

Further, for example, it is assumed that, during the operation of the LNG plant, an alarm regarding the discharge pressure upper limit value of the refrigerant compressor 31a for the precooling refrigerant is first output, and as a result, an operator performs the production reduction of the LNG so that the discharge pressure is recovered to fall within the operation management value range. Thus, there is a case in which, even though the production reduction of the LNG is continued, the operation constraints are not violated in terms of the constrained items (*1 to *5) illustrated in FIG. 1. In such a case, it is assumed that the production reduction appropriated as the one caused by "other" factor of FIG. 3 and FIG. 4 occurs.

It is assumed that, at this time, for example, reduction of a suction temperature of the ACHE being a condenser for the precooling refrigerant which is relatively easy to perform among the measures shown in FIG. 6 is performed (in FIG. 6, it is described as "reduction of C3 condenser (ACHE) suction temperature").

In this case, part of the production reduction caused by the bottle neck described as "C3 compressor discharge upper limit (*1)" in FIG. 3 and FIG. 4 can be eliminated. In addition, part of the production reduction appropriated as the one caused by "other" factor due to the operation adjustment as in the above-mentioned example can also be eliminated.

According to the operation analysis method of this example, the production amount data and the operation data of the LNG plant are associated with each other along a time series, and with regard to the plurality of the items subjected to the operation constraints (constrained items), the length of the production reduction period (period with the production amount data being less than the reference production amount) is determined in accordance with a magnitude of the production reduction amount, thereby being capable of clarifying the degree of influence of each of the items subjected to the operation constraints (bottle neck) on the production reduction.

Here, in the example illustrated in FIG. 1, description has been made of the example in which the operation analysis method of this example is applied to the LNG plant that uses the C3 refrigerant to precool the NG and cool a liquefying refrigerant (MR). However, the LNG plant to which the operation analysis method of this example is applicable is not limited to the example illustrated in FIG. 1.

For example, the LNG plant may be an LNG plant of a one-stage pressure MR type that uses only mixed refrigerant (MR) being liquefying refrigerant without use of, for example, the precooling refrigerant or refrigerant cooling refrigerant (C3 refrigerant in this example).

Further, also in the case of using the precooling refrigerant, the LNG plant may use single liquefying refrigerant (refrigerant material: nitrogen or methane). In contrast, the precooling refrigerant is also not limited to the case of using a single refrigerant material such as propane or propylene, and mixed refrigerant such as methane, ethane, propane, or butane may be used. Further, the LNG plant may include a subcooler configured to subcool the LNG with use of subcooling refrigerant including nitrogen or methane as a refrigerant material.

Besides, this technology is also applicable to an LNG plant of a cascade type, which is configured to acquire the LNG by sequentially cooling the NG with use of propane refrigerant, ethylene refrigerant, and methane refrigerant.

Further, the gas-liquid separation unit 11, the mercury removal unit 12, the acid gas removal unit 13, and the moisture removal unit 14 may also employ various configuration examples. For example, removal of acid gas may be performed with use of a separation film module configured to separate acid gas from NG.

Besides, the operation analysis method of this example is also applicable to a natural gas processing plant for separating and recovering at least one of liquefied petroleum gas (LPG) or a heavy component from natural gas and shipping a light component in a state of gas. In this case, the LPG or the heavy component and the gas become products.

The invention claimed is:

1. An operation analysis method for a natural gas plant, the natural gas plant is configured to produce a product from natural gas, the operation analysis method comprising:
    acquiring production amount data per unit time of the product and operation data of a plurality of controlled devices, which form the natural gas plant and each of the plurality of controlled device is subjected to operation control within a preset range of an operation constraints, for determination of whether or not each of the controlled devices violates the operation constraint, wherein the production amount data and the operation data are in association with a time series;
    with use of a computer, comparing a preset reference production amount per unit time and the production amount data, wherein a controlled device of the plurality of controlled devices that violates the operation constraint is present at a time point of acquisition of the production amount data less than the preset reference production amount, and performing data processing of associating an item subjected to the operation constraint related to the controlled device with the production amount data; and
    determining a production reduction amount that is a difference between production amount data associated with the item subjected to the operation constraint and the preset reference production amount, and determining, for each of the items subjected to the operation constraints, a length of a period with the production amount data being less than the preset reference production amount in accordance with a magnitude of the production reduction amount.

2. The operation analysis method for a natural gas plant according to claim 1, further comprising visualizing a correspondence between the length of the period with the production amount data being less than the preset reference production amount and the magnitude of the production reduction amount in a graph for the item subjected to the operation constraint.

3. The operation analysis method for a natural gas plant according to claim 1, wherein, in the determining the length of the period with the production amount data being less than the preset reference production amount, when a plurality of items subjected to a plurality of operation constraints are associated with the production amount data, based on priority set in advance for the items subjected to the operation constraints, an item of the plurality of items subjected to an operation constraint of the plurality of operation constraints that has a highest priority is included in the period in which the production amount data is less than the preset reference production amount.

4. The operation analysis method for a natural gas plant according to claim 3, wherein, with regard to the item subjected to the operation constraint having the highest priority, for the production amount data included in the period with the production amount data being less than the preset reference production amount, a period with the production amount data for a remainder of the operation constraints being less than the preset reference production amount is repeatedly calculated.

5. The operation analysis method for a natural gas plant according to claim 1, wherein the natural gas plant is a liquefied natural gas plant for producing liquefied natural gas as a product from natural gas, or a natural gas processing plant for separating and collecting at least one of liquefied petroleum gas (LPG), a heavy component, or a light component as a product from natural gas.

6. The operation analysis method for a natural gas plant according to claim 1, wherein combinations of the controlled devices and the respective items subjected to operation constraints include at least one of the combinations selected from a combination group consisting of:

(i) when the natural gas plant includes a compressor for precooling refrigerant for the natural gas, the controlled device is the precooling compressor and the item subjected to operation constraint is a discharge pressure upper limit value of the precooling compressor;

(ii) when the natural gas plant includes a compressor for liquefying refrigerant for the natural gas, the controlled device is the liquefying compressor and the item subjected to operation constraint is a drive force upper limit value of the liquefying compressor;

(iii) when the natural gas plant liquefies the natural gas with use of the liquefying refrigerant, the controlled device is a flow rate adjusting unit for the liquefying refrigerant and the item subjected to operation constraint is a flow rate upper limit of the liquefying refrigerant;

(iv) when the natural gas plant includes an acid gas removal unit configured to remove acid gas included in the natural gas by bringing the natural gas and an absorption liquid for acid gas into contact with each other, the controlled device is the acid gas removal unit and the item subjected to operation constraint is an upper limit value of a supply flow rate of the absorption liquid to the acid gas removal unit; and (v) when the natural gas plant includes an acid gas removal unit configured to remove acid gas included in the natural gas by bringing the natural gas and an absorption liquid for acid gas into contact with each other, the controlled device is the acid gas removal unit and the item subjected to operation constraint is an acid gas content upper limit of the natural gas having been processed by the acid gas removal unit.

* * * * *